United States Patent
Wakimoto et al.

(10) Patent No.: US 12,341,222 B2
(45) Date of Patent: Jun. 24, 2025

(54) SECONDARY BATTERY AND METHOD OF MANUFACTURING SAME

(71) Applicants: SANYO Electric Co., Ltd., Osaka (JP); Panasonic Corporation, Osaka (JP)

(72) Inventors: Ryoichi Wakimoto, Hyogo (JP); Hiroaki Imanishi, Hyogo (JP); Yukinobu Miyamura, Hyogo (JP)

(73) Assignees: SANYO ELECTRIC CO., LTD., Osaka (JP); PANASONIC HOLDINGS CORPORATION, Osaka (JP)

( * ) Notice: Subject to any disclaimer, the term of this patent is extended or adjusted under 35 U.S.C. 154(b) by 588 days.

(21) Appl. No.: 17/634,089

(22) PCT Filed: Sep. 11, 2020

(86) PCT No.: PCT/JP2020/034405
§ 371 (c)(1),
(2) Date: Feb. 9, 2022

(87) PCT Pub. No.: WO2021/060010
PCT Pub. Date: Apr. 1, 2021

(65) Prior Publication Data
US 2022/0376367 A1   Nov. 24, 2022

(30) Foreign Application Priority Data
Sep. 26, 2019  (JP) ................. 2019-174879

(51) Int. Cl.
*H01M 50/538* (2021.01)
*H01M 10/04* (2006.01)
(Continued)

(52) U.S. Cl.
CPC ..... *H01M 50/538* (2021.01); *H01M 10/0431* (2013.01); *H01M 50/103* (2021.01); *H01M 50/536* (2021.01)

(58) Field of Classification Search
CPC . H01M 50/103; H01M 50/536; H01M 50/538
See application file for complete search history.

(56) References Cited

U.S. PATENT DOCUMENTS

2014/0012519 A1    1/2014   Yamada et al.
2017/0373285 A1   12/2017   Tajima et al.
(Continued)

FOREIGN PATENT DOCUMENTS

CN    107528041 A       12/2017
EP    3319144 A1 *       5/2018   .......... H01M 2/0404
(Continued)

OTHER PUBLICATIONS

Translation of PCT written opinion (no date) (Year: 0000).*
(Continued)

*Primary Examiner* — Amanda C. Walke
(74) *Attorney, Agent, or Firm* — Rimon P.C.

(57) ABSTRACT

In this secondary battery in which an electrode body having a positive electrode tab group at one end thereof is accommodated in a battery case, a positive electrode terminal and the positive electrode tab group are electrically connected via a second positive electrode current collector, the positive electrode tab group is connected to a tab connection part of the second positive electrode current collector in a bent state, and a tape as a fixing means is attached across a first main surface of the electrode body-the tab connection part of the second positive electrode current collector-a second main surface of the electrode body.

6 Claims, 13 Drawing Sheets

(51) Int. Cl.
*H01M 50/103* (2021.01)
*H01M 50/536* (2021.01)

(56) References Cited

U.S. PATENT DOCUMENTS

| | | | |
|---|---|---|---|
| 2018/0375162 A1 | 12/2018 | Wakimoto et al. | |
| 2019/0067665 A1* | 2/2019 | Jang | H01M 50/176 |
| 2020/0251787 A1* | 8/2020 | Shinoda | H01M 10/0587 |
| 2022/0352606 A1* | 11/2022 | Wakimoto | H01M 50/188 |

FOREIGN PATENT DOCUMENTS

| | | | | |
|---|---|---|---|---|
| EP | 3451415 A1 * | 3/2019 | | H01M 10/04 |
| JP | 2014-014881 A | 1/2014 | | |
| JP | 2017-050069 A | 3/2017 | | |
| JP | 2019-087418 A | 6/2019 | | |
| WO | 2016/158398 A1 | 10/2016 | | |
| WO | WO-2018155521 A1 * | 8/2018 | | H01M 10/0431 |
| WO | WO-2018190016 A1 * | 10/2018 | | |
| WO | 2019/088053 A1 | 5/2019 | | |

OTHER PUBLICATIONS

Extended European Search Report dated Feb. 14, 2023 issued in the corresponding European Patent Application No. 20868978.6.
International Search Report and Written Opinion issued in International Patent Application No. PCT/JP2020/034405, dated Nov. 24, 2020, with partial English translation.

* cited by examiner

SECONDARY BATTERY AND METHOD OF MANUFACTURING SAME

CROSS-REFERENCE OF RELATED APPLICATIONS

This application is the U.S. National Phase under 35 U.S.C. § 371 of International Patent Application No. PCT/JP2020/034405, filed on Sep. 11, 2020, which in turn claims the benefit of Japanese Application No. 2019-174879, filed on Sep. 26, 2019, the entire disclosures of which Applications are incorporated by reference herein.

TECHNICAL FIELD

The present disclosure relates to a secondary battery and a manufacturing method thereof.

BACKGROUND ART

Secondary batteries, such as alkaline secondary batteries and non-aqueous electrolyte secondary batteries, are used in power supplies for electric vehicles (EVs), hybrid electric vehicles (HEVs or PHEVs), and the like.

Battery cases of these secondary batteries consist of a bottomed cylindrical outer body having an opening and a sealing plate that seals the opening. Each battery case contains an electrode assembly consisting of a positive electrode plate, a negative electrode plate, and a separator, together with an electrolyte. A positive electrode terminal and a negative electrode terminal are attached to the sealing plate. The positive electrode terminal is electrically connected to the positive electrode plate via a positive electrode current collector, and the negative electrode terminal is electrically connected to the negative electrode plate via a negative electrode current collector.

As such a secondary battery, a secondary battery has been proposed which has an electrode group consisting of a positive electrode and a negative electrode wound with a separator therebetween, current-collecting tabs that are formed at both ends of the electrode group and welded to the leads in a state where they are bent against the direction along the winding axis of the electrode group (Patent Literature 1 listed below).

CITATION LIST

Patent Literature

PATENT LITERATURE 1: Japanese Unexamined Patent Application Publication No. 2014-14881

SUMMARY

A secondary battery according to one aspect of the present disclosure comprises:
an electrode assembly including a positive electrode plate and a negative electrode plate;
a rectangular outer body having an opening and containing the electrode assembly;
a sealing plate for sealing the opening; and
a terminal attached to the sealing plate, wherein
the electrode assembly has a positive electrode tab group at one end and a negative electrode tab group at the other end,
the electrode assembly has a first main surface and a second main surface oriented facing each other,
the rectangular outer body has a bottom, a pair of first side walls oriented facing each other, and a pair of second side walls oriented facing each other,
the positive electrode tab group is located adjacent to one of the first side walls,
the negative electrode tab group is located adjacent to the other first side wall,
the positive electrode tab group or the negative electrode tab group, and the terminal are electrically connected to each other through a current collector,
the positive electrode tab group or the negative electrode tab group is connected to the current collector while being bent, and
fixing means are attached across the first main surface, the current collector and the second main surface.

With the configuration of the secondary battery according to one aspect of the present disclosure, the secondary battery exhibits a higher volumetric energy density and has a structure that is easy to assemble.

With respect to the width direction of the current collector, a joint between the current collector and the positive electrode tab group or the negative electrode tab group may be displaced toward the root of the positive electrode tab group or the negative electrode tab group.

The positive electrode tab group or the negative electrode tab group may have a contact region that is in contact with the current collector, a root region located closer to the root of the positive electrode tab group or the negative electrode tab group than the contact region, and a tip region located closer to the tip of the positive electrode tab group or the negative electrode tab group than the contact region.

The fixing means may be in contact with the tip region.

The fixing means may be a tape.

The end of the fixing means adjacent to the sealing plate may be located closer to the sealing plate than the end of the positive electrode tab group or the negative electrode tab group adjacent to the sealing plate, and
the end of the fixing means adjacent to the bottom may be located closer to the bottom than the end of the positive electrode tab group or the negative electrode tab group adjacent to the bottom.

The end of the current collector adjacent to the bottom may be located closer to the bottom than the end of the positive electrode tab group or the negative electrode tab group adjacent to the bottom.

A method of manufacturing a secondary battery according to one aspect of the present disclosure comprises:
an electrode assembly including a positive electrode plate and a negative electrode plate;
a rectangular outer body having an opening and containing the electrode assembly;
a sealing plate for sealing the opening; and
a terminal attached to the sealing plate, wherein
the electrode assembly has a positive electrode tab group at one end and a negative electrode tab group at the other end,
the electrode assembly has a first main surface and a second main surface oriented facing each other,
the rectangular outer body has a bottom, a pair of first side walls oriented facing each other, and a pair of second side walls oriented facing each other,
the positive electrode tab group or the negative electrode tab group, and the terminal are electrically connected to each other through a current collector, the method comprising the steps of:
connecting the positive electrode tab group or the negative electrode tab group to the current collector;

bending the positive electrode tab group or the negative electrode tab group, and changing the orientation of the current collector connected to the positive electrode tab group or the negative electrode tab group; and attaching fixing means across the first main surface, the current collector and the second main surface, thereby fixing the positive electrode tab group or the negative electrode tab group being bent.

The method of manufacturing a secondary battery according to one aspect of the present disclosure allows the secondary battery to exhibit a higher volumetric energy density and to be manufactured easily.

With respect to the width direction of the current collector, a joint between the current collector and the positive electrode tab group or the negative electrode tab group may be formed so that the joint is displaced toward the root of the positive electrode tab group or the negative electrode tab group.

The current collector may include a first current collector and a second current collector, the positive electrode tab group or the negative electrode tab group may be connected to the second current collector, and the method may further comprise the step of connecting the second current collector that is connected to the positive electrode tab group or the negative electrode tab group and has the fixing means, to the first current collector that is attached to the sealing plate.

The fixing means may be a tape.

The present disclosure provides a secondary battery with a higher volumetric energy density.

DESCRIPTION OF EMBODIMENTS

The configuration of the secondary battery 20 according to an embodiment will be described below. Note that the present disclosure is not limited to the following embodiments.

Figure 1:
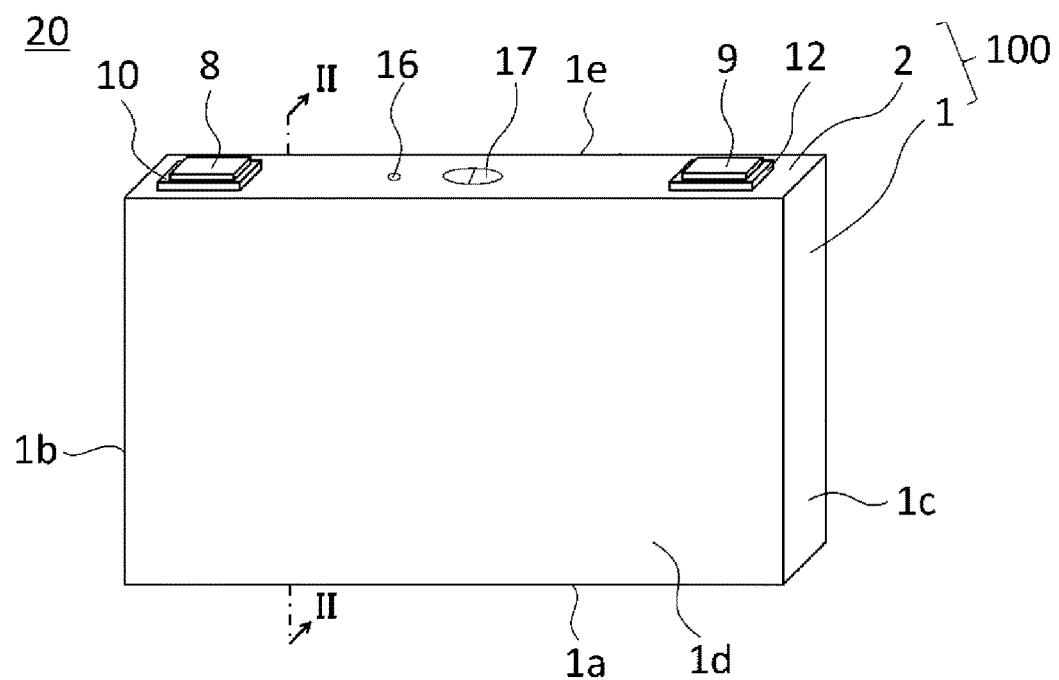
FIG. 1 is a perspective view of a secondary battery according to an embodiment.
Figure 2:
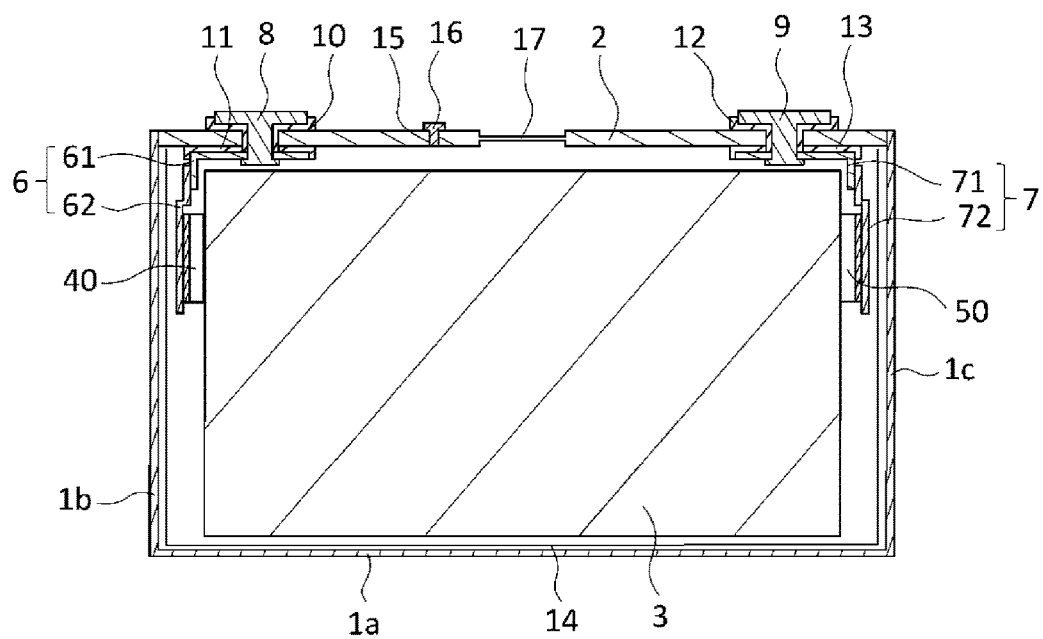
FIG. 2 is a cross-sectional view of the secondary battery along line II-II in FIG. 1.

As shown in FIGS. 1 and 2, the secondary battery 20 comprises a battery case 100 consisting of a bottomed cylindrical rectangular outer body 1 having an opening, and a sealing plate 2 sealing the opening of the rectangular outer body 1. The rectangular outer body 1 has a bottom 1a, a pair of first side walls 1b and 1c, and a pair of second side walls 1d and 1e. The pair of first side walls 1b and 1c are oriented facing each other, and the pair of second side walls 1d and 1e are oriented facing each other. The area of each of the pair of first side walls 1b and 1c is smaller than the area of each of the pair of second side walls 1d and 1e, respectively. The rectangular outer body 1 and the sealing plate 2 are preferably made of metal, more preferably aluminum or iron. An electrode assembly 3 including a positive electrode plate 4 and a negative electrode plate 5 is contained in the rectangular outer body 1 together with an electrolyte. The electrode assembly 3 according to the embodiment is a flat wound electrode assembly in which a strip-like positive electrode plate 4 and a strip-like negative electrode plate 5 are wound with a strip-like separator therebetween. In the electrode assembly 3, a positive electrode tab group 40 is provided at one end with respect to the direction along the winding axis, and a negative electrode tab group 50 is provided at the other end with respect to the direction along the winding axis.

The positive electrode terminal 8 and the negative electrode terminal 9 are attached to the sealing plate 2. The positive electrode tab group 40 is electrically connected to the positive electrode terminal 8 via the positive electrode current collector 6. The positive electrode current collector 6 includes a first positive electrode current collector 61 and a second positive electrode current collector 62. The negative electrode tab group 50 is electrically connected to the negative electrode terminal 9 via the negative electrode current collector 7. The negative electrode current collector 7 includes a first negative electrode current collector 71 and a second negative electrode current collector 72.

The positive electrode tab group 40 includes multiple positive electrode tabs 4b. The second positive electrode current collector 62 has a region located along the first side wall 1b of the rectangular outer body 1. The positive electrode tab group 40 being bent is connected to the region located along the first side wall 1b in the second positive electrode current collector 62. The second positive electrode current collector 62 has a plate-like region located along the first side wall 1b of the rectangular outer body 1, and the positive electrode tab group 40 is connected to the electrode assembly 3 side surface of the plate-like region. The inclination of the plate-like region with respect to the first side wall 1b is preferably smaller than ±30°, more preferably smaller than ±15°, even more preferably smaller than ±10°. It is more preferred that the plate-like region be generally parallel to the first side wall 1b (e.g., the inclination of the plate-like region with respect to the first side wall 1b be within ±5°).

The negative electrode tab group 50 includes multiple negative electrode tabs 5b. The second negative electrode current collector 72 has a region located along the first side wall 1c of the rectangular outer body 1. The negative electrode tab group 50 being bent is connected to the region located along the first side wall 1c in the second negative electrode current collector 72. The second negative electrode current collector 72 has a plate-like region located along the first side wall 1c of the rectangular outer body 1, and the negative electrode tab group 50 is connected to the electrode assembly 3 side surface of the plate-like region. The inclination of the plate-like region with respect to the first side wall 1c is preferably smaller than ±30°, more preferably smaller than ±15°, even more preferably smaller than ±10°. It is more preferred that the plate-like region be generally parallel to the first side wall 1c (e.g., the inclination of the plate-like region with respect to the first side wall 1c be within ±5°).

An outer insulating member 10 made of resin is located between the sealing plate 2 and the positive electrode terminal 8. An inner insulating member 11 made of resin is located between the sealing plate 2 and the first positive electrode current collector 61. An outer insulating member 12 made of resin is located between the sealing plate 2 and the negative electrode terminal 9. An inner insulating member 13 made of resin is located between the sealing plate 2 and the first negative electrode current collector 71.

The electrode assembly 3 is located inside an electrode assembly holder 14 which is a resin insulating sheet folded into a box or bag shape.

The sealing plate 2 has an electrolyte injection hole 15, and the electrolyte injection hole 15 is sealed by a sealing member 16. The sealing plate 2 has a gas discharge valve 17 that breaks when the pressure inside the battery case 100 exceeds a predetermined level to discharge gas from the battery case 100.

The method of manufacturing the secondary battery 20 and the details of each configuration will now be explained.

[Attachment of Terminals and First Current Collector to Sealing Plate]

The sealing plate 2 has a positive electrode terminal attachment hole near one end, and a negative electrode terminal attachment hole near the other end. The outer insulating member 10 is located on the outer side of the periphery of the positive electrode terminal attachment hole of the sealing plate 2, and the inner insulating member 11 and the first positive electrode current collector 61 are located on the internal side of the periphery of the positive electrode terminal attachment hole of the sealing plate 2. The positive electrode terminal 8 is then inserted from the outside of the battery through the through hole of the outer insulating member 10, the positive electrode terminal attachment hole of the sealing plate 2, the through hole of the inner insulating member 11, and the through hole of the first positive electrode current collector 61, and the positive electrode terminal 8 is swaged on the first positive electrode current collector 61. It is more preferable to also weld the swaged portion of the positive electrode terminal 8 to the first positive electrode current collector 61.

The outer insulating member 12 is located on the outer side of the periphery of the negative electrode terminal attachment hole of the sealing plate 2, and the inner insulating member 13 and the first negative electrode current collector 71 are located on the internal side of the periphery of the negative electrode terminal attachment hole of the sealing plate 2. The negative electrode terminal 9 is then inserted from the outside of the battery through the through hole of the outer insulating member 12, the negative electrode terminal attachment hole of the sealing plate 2, the through hole of the inner insulating member 13, and the through hole of the first negative electrode current collector 71, and the negative electrode terminal 9 is swaged on the first negative electrode current collector 71. It is more preferable to also weld the swaged portion of the negative electrode terminal 9 to the first negative electrode current collector 71.

Figure 3A:
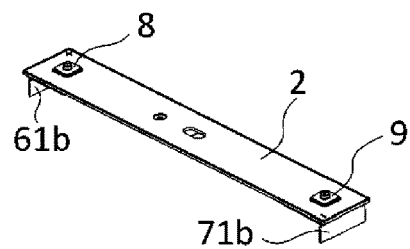
FIG. 3A shows the battery outer side of the sealing plate with the positive electrode terminal, the negative electrode terminal, the first positive electrode current collector, and the first negative electrode current collector.
Figure 3B:
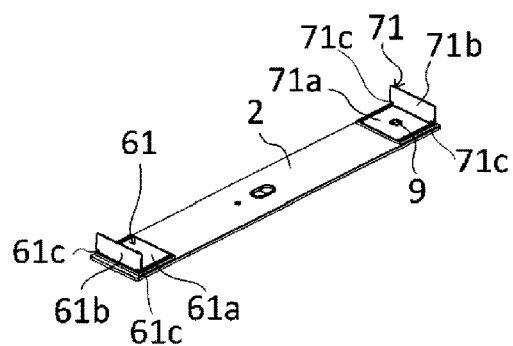
FIG. 3B shows the battery inner side of the sealing plate with the positive electrode terminal, the negative electrode terminal, the first positive electrode current collector, and the first negative electrode current collector.

FIGS. 3A and 3B are perspective views of the sealing plate 2 with the positive electrode terminal 8, the first positive electrode current collector 61, the negative electrode terminal 9, and the first negative electrode current collector 71 attached thereto. FIG. 3A shows it from the outside of the battery, and FIG. 3B shows it from the inside of the battery.

The first positive electrode current collector 61 has a first region 61a that is located along the sealing plate 2, and a second region 61b bent at the end of the first region 61a. In the state of the secondary battery 20, the first region 61a is located between the sealing plate 2 and the electrode assembly 3. The second region 61b extends from the first region 61a toward the bottom 1a of the rectangular outer body 1. The second region 61b is located between the first side wall 1b of the rectangular outer body 1 and the electrode assembly 3.

The first negative electrode current collector 71 has a first region 71a that is located along the sealing plate 2, and a second region 71b bent at the end of the first region 71a. In the state of the secondary battery 20, the first region 71a is located between the sealing plate 2 and the electrode assembly 3. The second region 71b extends from the first region 71a toward the bottom 1a of the rectangular outer body 1. The second region 71b is located between the first side wall 1c of the rectangular outer body 1 and the electrode assembly 3.

In the second region 61b of the first positive electrode current collector 61, a notch 61c is preferably provided at both ends with respect to the width direction. When the second positive electrode current collector 62 described below is connected to the second region 61b, having the notch 61c makes it possible to perform welding more stably and to form a higher quality joint stably. Each notch 61c is preferably located closer to the bottom 1a of the rectangular outer body 1 than the inner insulating member 11, in the second region 61b. Each notch 61c is preferably provided in the second region 61b but near the end adjacent to the first region 61a. Note that it is also preferable to provide a notch 71c at both ends in the width direction with respect to the second region 71b of the first negative electrode current collector 71. In the case where the inner insulating member 11 has a wall covering a part of the second region 61b, the notches 61c preferably have a region that is not covered by the wall of the inner insulating member 11.

The positive electrode terminal 8 and the first positive electrode current collector 61 are preferably made of metal, more preferably aluminum. The negative electrode terminal 9 and the first negative electrode current collector 71 are preferably made of metal, more preferably copper. Note that the negative electrode terminal 9 can include a region of aluminum and a region of copper. In this case, it is preferable to connect the region of copper to the first negative electrode current collector 71 made of copper, and expose the region of aluminum to the outside of the battery.

[Positive Electrode Plate]

First, the method of manufacturing the positive electrode plate will be explained.

[Preparation of Positive Electrode Active Material Layer Slurry]

Lithium nickel-cobalt-manganese composite oxide as a positive electrode active material, polyvinylidene fluoride (PVdF) as a binder, carbon material as a conductive agent, and N-methyl-2-pyrrolidone (NMP) as a dispersant are mixed so that the mass ratio of lithium nickel-cobalt-manganese composite oxide:PVdF:carbon material is 97.5:1:1.5, thereby preparing a positive electrode active material layer slurry.

[Preparation of Positive Electrode Protective Layer Slurry]

Alumina powder, a carbon material as a conductive agent, polyvinylidene fluoride (PVdF) as a binder, and N-methyl-2-pyrrolidone (NMP) as a dispersant are mixed so that the mass ratio of alumina powder:carbon material:PVdF is 83:3:14, thereby preparing a protective layer slurry.

[Formation of Positive Electrode Active Material Layer and Positive Electrode Protective Layer]

The positive electrode active material layer slurry and positive electrode protective layer slurry each prepared by the method described above are applied to both sides of an aluminum foil as the positive electrode current collector, using a die coater. At this time, the positive electrode active material layer slurry is applied to the center of the positive electrode current collector with respect to the width direction. In addition, the positive electrode protective layer slurry is applied to, with respect to the width direction, the ends of the region with the positive electrode active material layer slurry applied to it.

The positive electrode current collector with the positive electrode active material layer slurry and the positive electrode protective layer slurry applied to it is dried to remove NMP contained in the positive electrode active material layer slurry and the positive electrode protective layer slurry. As a result, the positive electrode active material layer and positive electrode protective layer are formed. After that, the positive electrode active material layer is compressed to make a positive electrode base plate. This positive electrode base plate is cut into a predetermined shape to make the positive electrode plate 4. The cutting of the positive electrode base plate can be performed by energy beam irradiation such as a laser beam, a mold, a cutter, or the like.

Figure 4:
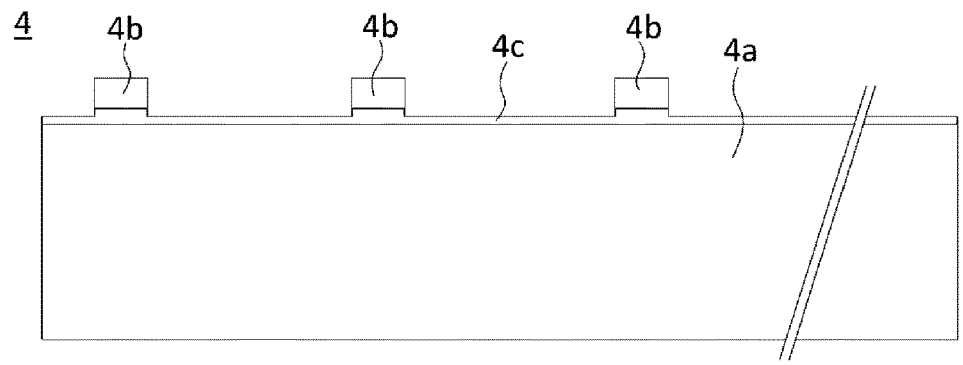
FIG. 4 shows a plan view of the positive electrode plate according to the embodiment.

FIG. 4 is a plan view of the positive electrode plate 4. The positive electrode plate 4 has a region where the positive electrode active material layer 4a is formed, on both sides of the positive electrode current collector. Multiple positive electrode tabs 4b are provided at one end of the positive electrode plate 4 with respect to the width direction. The positive electrode tabs 4b consist of exposed portions of the positive electrode current collector. A positive electrode protective layer 4c, which has lower conductivity than the positive electrode active material layer 4a, is provided at the root of the positive electrode tabs 4b. The positive electrode protective layer 4c can be, for example, an insulating layer made of resin or a layer including a ceramic and resin binder. The positive electrode protective layer 4c may also include a conductive agent such as a carbon material. The positive electrode protective layer 4c does not necessarily have to be provided.

[Negative Electrode Plate]

The method of manufacturing the negative electrode plate will now be explained.

[Preparation of Negative Electrode Active Material Layer Slurry]

Graphite as a negative electrode active material, styrene-butadiene rubber (SBR) and carboxymethyl cellulose (CMC) as binders, and water as a dispersant are mixed so that the mass ratio of graphite:SBR:CMC is 98:1:1, thereby preparing the negative electrode active material layer slurry.

[Formation of Negative Electrode Active Material Layer]

The negative electrode active material layer slurry prepared by the method described above is applied to both sides of an 8-μm-thick copper foil as the negative electrode current collector, using a die coater.

The negative electrode current collector with the negative electrode active material layer slurry applied to it is dried to remove water contained in the negative electrode active material layer slurry. As a result, the negative electrode active material layer is formed. After that, the negative electrode active material layer is compressed to make a negative electrode base plate. The negative electrode base plate is cut into a predetermined shape to make the negative electrode plate 5. The negative electrode base plate can be cut by energy beam irradiation such as a laser beam, a mold, a cutter, or the like.

Figure 5:
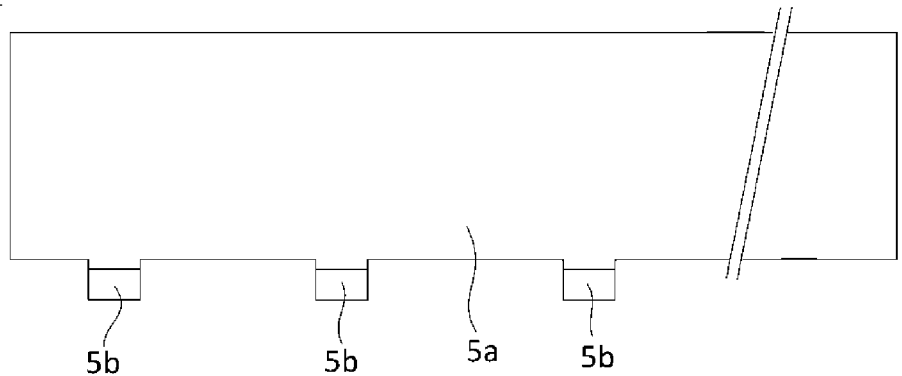
FIG. 5 is a plan view of a negative electrode plate according to the embodiment.

FIG. 5 is a plan view of the negative electrode plate 5. The negative electrode plate 5 has a region where the negative electrode active material layer 5a is formed, on both sides of the negative electrode current collector. Multiple negative electrode tabs 5b are provided at one end of the negative electrode plate 5 with respect to the width direction. The negative electrode tabs 5b consist of exposed portions of the negative electrode current collector.

[Fabrication of Electrode Assembly]

The strip-like positive electrode plate 4 and strip-like negative electrode plate 5 each fabricated by the method described above are wound with a polyolefin strip-like separator therebetween to fabricate a flat, wound electrode assembly 3. The electrode assembly 3 has a flat region in the center and curved portions at both ends of the flat region. One outer surface of the flat region is a first main surface 3a, and the other outer surface of the flat region is a second main surface 3b.

Figure 6:
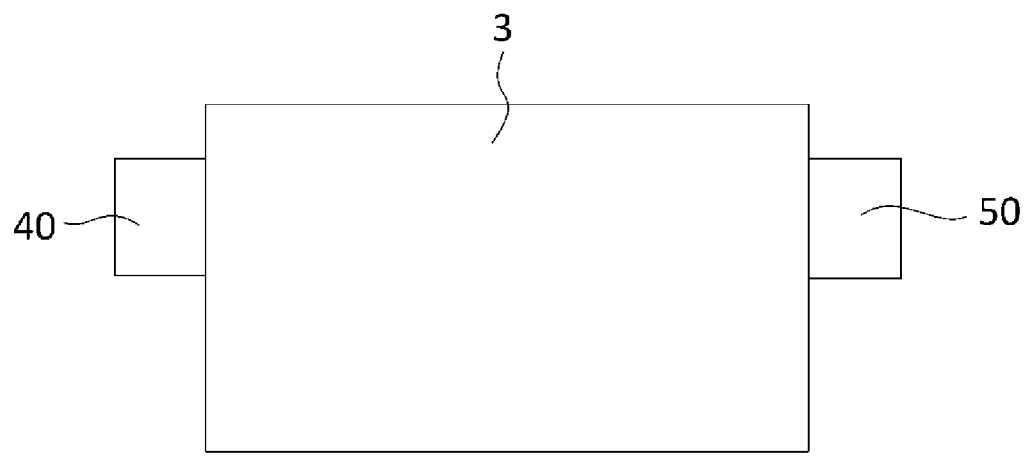
FIG. 6 is a plan view of an electrode assembly according to the embodiment.

FIG. 6 is a plan view of the electrode assembly 3. A positive electrode tab group 40 in which multiple positive electrode tabs 4b are laminated is provided at one end with respect to the direction along the winding axis of the electrode assembly 3, and a negative electrode tab group 50 in which multiple negative electrode tabs 5b are laminated is provided at the other end with respect to the direction along the winding axis of the electrode assembly 3. Note that in the direction perpendicular to the direction along the winding axis of the electrode assembly 3 and perpendicular to the thickness direction of the electrode assembly 3 (vertical direction in FIG. 6), the center of the positive electrode tab group 40 and the center of the negative electrode tab group 50 are displaced to one side (upper side in FIG. 6) from the winding axis.

Note that the positive electrode tabs 4b and/or the negative electrode tabs 5b in a plan view may have a shape gradually increasing in width from the tip to the root. With this configuration, even if the secondary battery 20 is subjected to shock or vibration, the positive electrode tabs 4b and/or the negative electrode tabs 5b in the secondary battery 20 are not easily damaged. It is more effective to make the corners of the root portions round-shaped. Providing a positive electrode protective layer 4c at the root of each positive electrode tab 4b as described above can suppress damage to the positive electrode tabs 4b. Also, providing a negative electrode active material layer 5a at the root of each negative electrode tab 5b can suppress damage to the negative electrode tabs 5b.

[Second Positive Electrode Current Collector and Second Negative Electrode Current Collector]

Figure 7A:
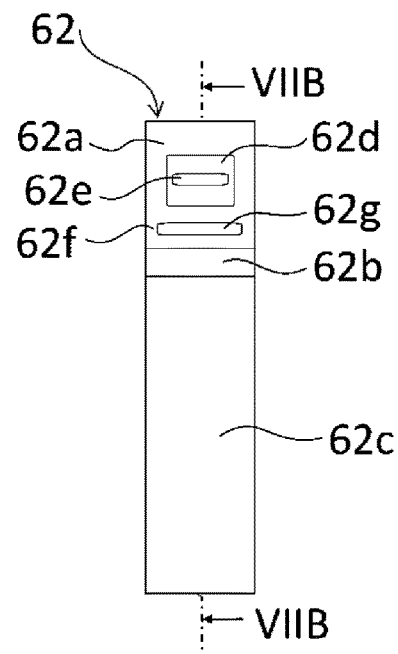
FIG. 7A is a plan view of a second positive electrode current collector according to the embodiment.
Figure 7B:
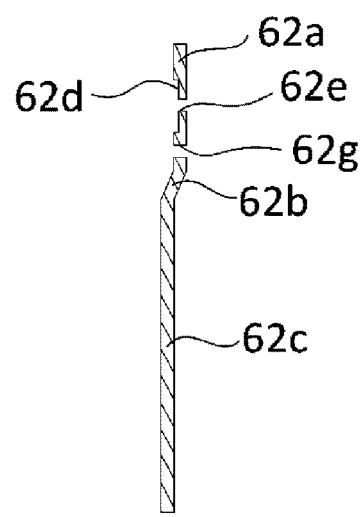
FIG. 7B is a cross-sectional view of the second positive electrode current collector along line VIIB-VIIB in FIG. 7B.

FIG. 7A is a plan view of the second positive electrode current collector 62. FIG. 7B is a cross-sectional view along line VIIB-VIIB shown in FIG. 7A. The second positive electrode current collector 62 has a second region connecting portion 62a, a slope portion 62b, and a tab connecting portion 62c. The second region connecting portion 62a is connected to the second region 61b of the first positive electrode current collector 61. The positive electrode tab group 40 is connected to the tab connecting portion 62c. The slope portion 62b is inclined with respect to the second region connecting portion 62a and the tab connecting portion 62c, and connects the second region connecting portion 62a and the tab connecting portion 62c together. The slope portion 62b creates a step between the second region connecting portion 62a and the tab connecting portion 62c. The slope portion 62b may form any angle with respect to the second region connecting portion 62a and the slope portion 62b may form any angle with respect to the tab connecting portion 62c. The second positive electrode current collector 62 may have any shape. The second positive electrode current collector 62 can be a flat plate.

The second region connecting portion 62a has a recess 62d. The portion where the recess 62d is provided is thinner than the surrounding area. A through hole 62e is provided inside the recess 62d. Inside the recess 62d, the second region 61b and the second region connecting portion 62a are joined.

A fuse section 62f is provided in the second region connecting portion 62a. The fuse section 62f is a portion that blows when an excessive current flows in the secondary battery 20. The fuse section 62f is a section with a cross-sectional area made small by forming a fuse hole 62g in the second region connecting portion 62a. The fuse section 62f is preferably located in the second positive electrode current collector 62 but between the position where the second region 61b is joined and the position where the positive electrode tab group 40 is joined. The fuse section 62f should be at least a portion with a reduced cross-sectional area, and can be a portion with a notch or thin portion.

The shape of the second negative electrode current collector 72 can be the same as that of the second positive electrode current collector 62. The second positive electrode current collector 62 is preferably made of metal, more preferably aluminum. The second negative electrode current collector 72 is preferably made of metal, more preferably copper, nickel, or iron.

The second positive electrode current collector 62 does not necessarily have to have a fuse section 62f. Also, the second negative electrode current collector 72 does not necessarily have to have a fuse section.

[Connection between First Current Collector and Tab Group]

Figure 8:
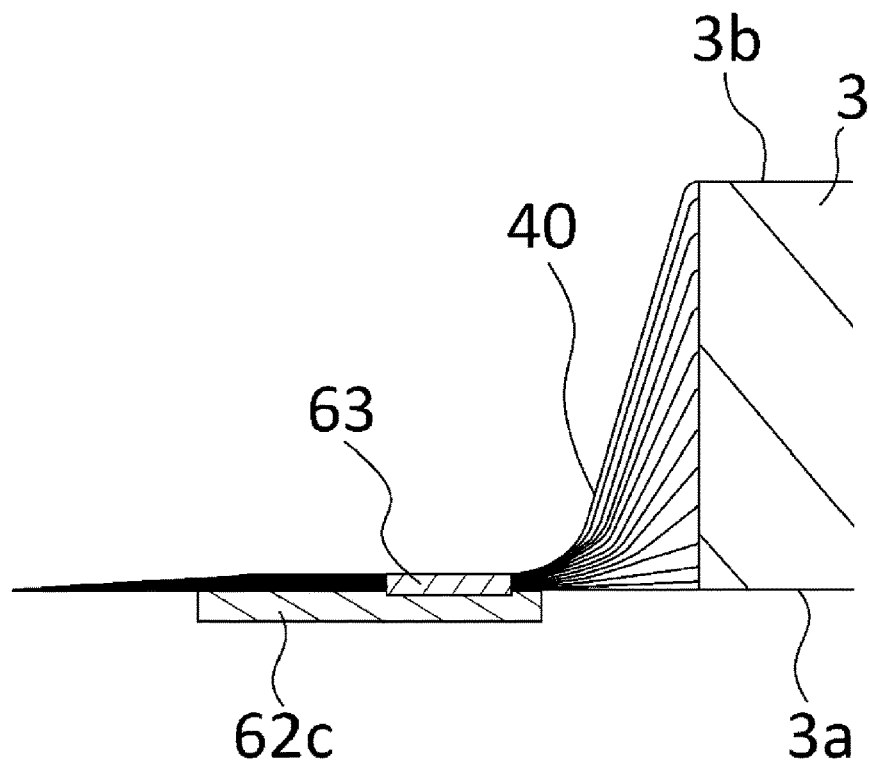
FIG. 8 is a cross-sectional view of the second positive electrode current collector with the positive electrode tab group connected to it.

As shown in FIG. 8, a positive electrode tab group 40 is located on the tab connecting portion 62c of the second positive electrode current collector 62, and the tab connecting portion 62c and the positive electrode tab group 40 are joined to form the joint 63. For joining, ultrasonic welding (ultrasonic joining), resistance welding, welding by irradiation of high energy rays such as laser beams, or the like can be used. The tab connecting portion 72c of the second negative electrode current collector 72 and the negative electrode tab group 50 can be joined in a similar manner.

In the tab connecting portion 62c of the second positive electrode current collector 62, the joint 63 is preferably displaced toward the root of the positive electrode tab group 40 (right side in FIG. 8) with respect to the width direction of the tab connecting portion 62c (left-right direction in FIG. 8). With this configuration, when the positive electrode tab group 40 is bent, a curved shape can be formed more accurately near the root of the positive electrode tab group 40 stably. This can suppress damage to the positive electrode tab group 40. In addition, even if the positive electrode tab 4b is misaligned, the positive electrode tab group 40 and the tab connecting portion 62c can be joined stably.

As shown in FIG. 8, the positive electrode tab group 40 and the tab connecting portion 62c are preferably joined in the state where the tip of the positive electrode tab group 40 is located outside (left side in FIG. 8) the tab connecting portion 62c of the second positive electrode current collector 62. This allows the positive electrode tab group 40 and the tab connecting portion 62c to be joined more stably.

Figure 9:
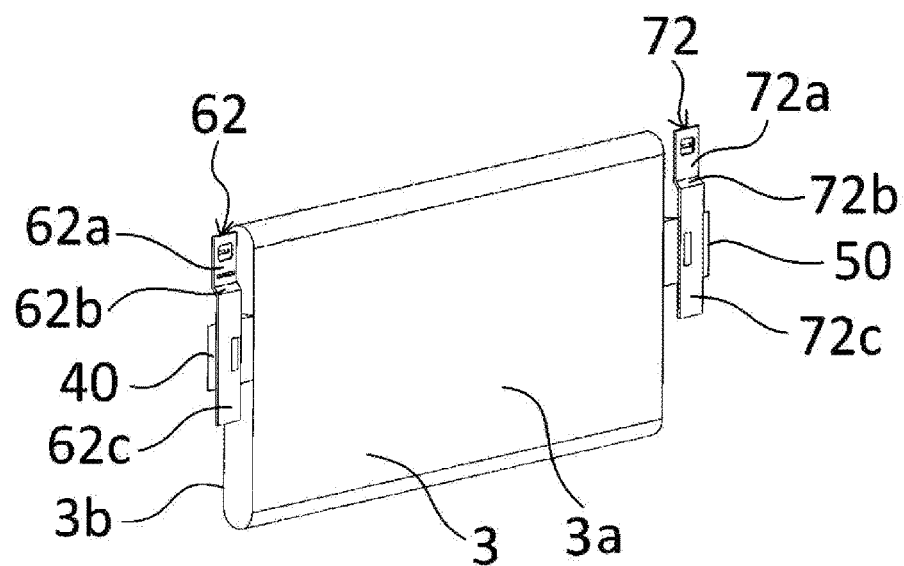
FIG. 9 is a perspective view of the electrode assembly with the second positive electrode current collector and the second negative electrode current collector attached to it.

FIG. 9 is a perspective view of the electrode assembly 3 with the second positive electrode current collector 62 and the second negative electrode current collector 72 attached to it. The lower end of the second positive electrode current collector 62 (the portion to be the end adjacent to the bottom 1a of the rectangular outer body 1) is preferably located below the lower end of the positive electrode tab group 40 (the portion to be the end adjacent to the bottom 1a of the rectangular outer body 1). This configuration enables the positive electrode tab group 40 to be bent more accurately and stably in the step of bending the positive electrode tab group 40 described below. Note that the same applies to the second negative electrode current collector 72 and the negative electrode tab group 50.

[Bending of Tab Group]

Figure 10:
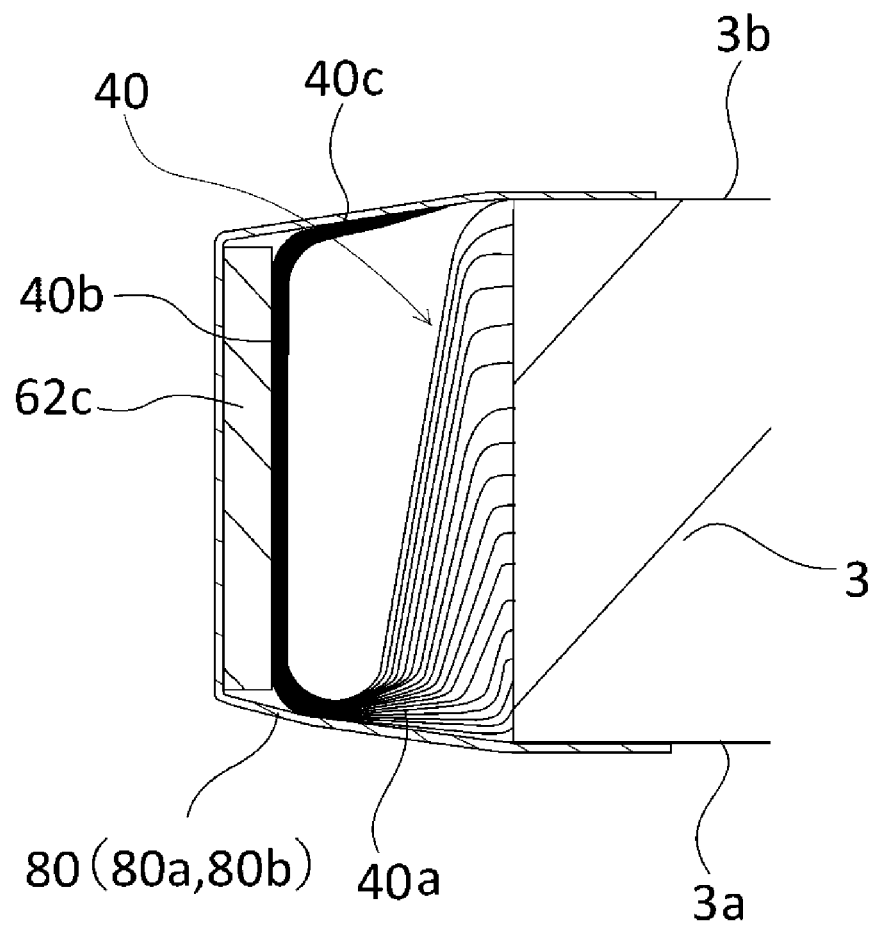
FIG. 10 is a cross-sectional view of the vicinity of the connecting portion between the second positive electrode current collector and the positive electrode tab group, showing the state in which the positive electrode tab group is bent and fixed.

As shown in FIG. 10, the positive electrode tab group 40 is bent. As shown in FIG. 9, the tab connecting portion 62c of the second positive electrode current collector 62 positioned in generally parallel with the first and second main surfaces 3a and 3b of the electrode assembly 3 is oriented generally perpendicular to the winding axis of the electrode assembly 3 (e.g., so that the inclination of the tab connecting portion 62c to the winding axis is smaller than ±15°) by bending the positive electrode tab group 40. Subsequently, a tape 80 as fixing means is attached so that it is located across the first main surface 3a of the electrode assembly 3, the tab connecting portion 62c and the second main surface 3b of the electrode assembly 3. With this configuration, the positive electrode tab group 40 can be maintained in a curved state more stably. Besides, the curved positive electrode tab group 40 exhibits elasticity, which allows the second positive electrode current collector 62 to move toward the electrode assembly 3 when the second positive electrode current collector 62 is pressed toward the electrode assembly 3. When the positive electrode tab group 40 is bent, the second positive electrode current collector 62 itself is not bent.

As shown in FIG. 10, the positive electrode tab group 40 has a contact region 40b that is in contact with the tab connecting portion 62c, a root region 40a located closer to the root of the positive electrode tab group 40 than the contact region 40b, and a tip region 40c located closer to the tip of the positive electrode tab group 40 than the contact region 40b. The tip region 40c is fixed by the tape 80 while being bent at the contact region 40b, improving the ease of assembly in the subsequent step. Providing the tip region 40c allows the contact region 40b to be made wider, and the positive electrode tab group 40 and the tab connecting portion 62c can be joined more stably. It should be noted that the tip region 40c does not necessarily have to be provided.

Similarly to the positive electrode tab group 40, the negative electrode tab group 50 is also fixed while being bent.

[Electrode Assembly Group]

Figure 11:
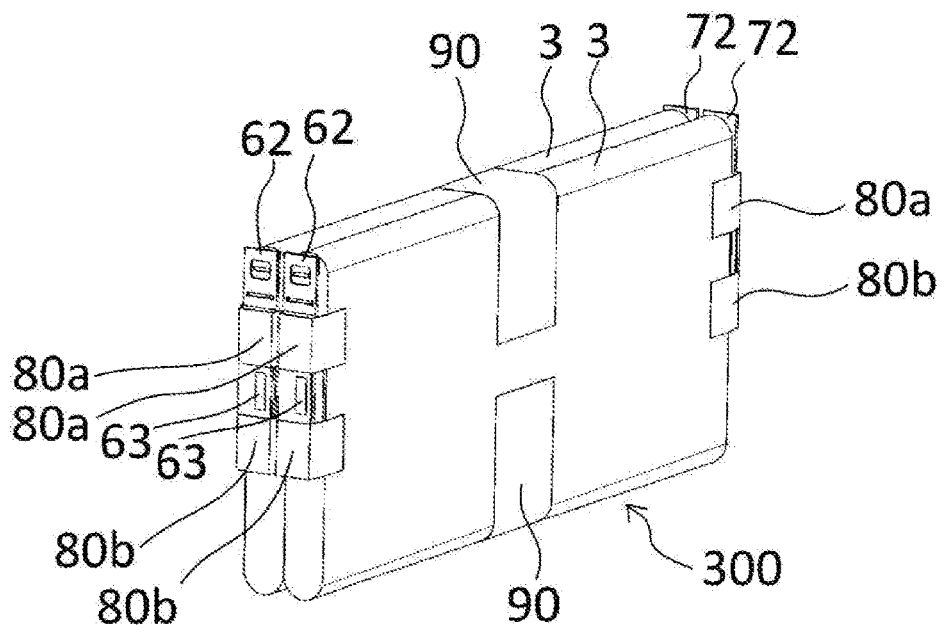
FIG. 11 is a perspective view of an electrode assembly group including multiple electrode assemblies.

Multiple electrode assemblies 3 with the positive electrode tab group 40 and the negative electrode tab group 50 bent each are stacked, and fixed together with electrode assembly fixing means 90 such as a tape, to be an electrode assembly group 300. FIG. 11 is a perspective view of an electrode assembly group 300. Each positive electrode tab group 40 is located on the same side, and each negative electrode tab group 50 is located on the same side. In each electrode assembly 3, each positive electrode tab group 40 is bent in the same direction. In each electrode assembly 3, each negative electrode tab group 50 is bent in the same direction. The electrode assembly group 300 according to the embodiment includes two electrode assemblies 3. Note that the number of electrode assemblies 3 included in the electrode assembly group 300 is not limited to two.

Each tape 80 as fixing means that are applied across the first main surface 3a of the electrode assembly 3, the tab connecting portion 62c and the second main surface 3b of the electrode assembly 3 preferably includes a first tape 80a and a second tape 80b. As shown in FIG. 11, in the tab connecting portion 62c of the second positive electrode current collector 62, it is preferable that the first tape 80a be attached above the joint 63 between the tab connecting portion 62c and the positive electrode tab group 40, and the second tape 80b be attached below the joint 63 between the tab connecting portion 62c and the positive electrode tab group 40. With such a configuration, the curved state of the positive electrode tab group 40 can be stably maintained. The same applies to the tab connecting portion 72c of the second negative electrode current collector 72.

As shown in FIG. 11, it is preferable that the upper end of the first tape 80a located on the upper side be located above the upper end of the positive electrode tab group 40, and the lower end of the second tape 80b located on the lower side be located below the lower end of the positive electrode tab group 40. With such a configuration, the curved shape of the positive electrode tab group 40 can be maintained more accurately.

As shown in FIG. 11, in the stacking direction of the electrode assemblies 3, the second positive electrode current collectors 62 attached to the respective electrode assemblies 3 are spaced apart and connected on the second region 61b of the first positive electrode current collector 61. The same applies to each second negative electrode current collector 72.

In the electrode assembly 3 according to the embodiment, the joint 63 between the positive electrode tab group 40 and the tab connecting portion 62c is located between the lower end of the first tape 80a and the upper end of the second tape 80b.

Although there are two tapes: the first tape 80a and the second tape 80b separated up and down, in the embodiment, only one tape may be used instead. In this case, the upper end of one tape is preferably located above the upper end of the positive electrode tab group 40, and the lower end of the tape is preferably located below the lower end of the positive electrode tab group 40. The tape 80 may cover the portion of the tab connecting portion 62c where the joint 63 is formed. The same configuration can be used for the second negative electrode current collector 72 and the negative electrode tab group 50 side.

[Connection Between First Current Collector and Second Current Collector]

The second region 61b of the first positive electrode current collector 61 is located inner than the second region connecting portion 62a of the second positive electrode current collector 62, and the second region 71b of the first negative electrode current collector 71 is located inner than the second region connecting portion 72a of the second negative electrode current collector 72. The second region 61b of the first positive electrode current collector 61 and the second region connecting portion 62a of the second positive electrode current collector 62 are connected to each other. In addition, the second region 71b of the first negative electrode current collector 71 is joined to the second region connecting portion 72a of the second negative electrode current collector 72. For joining, ultrasonic welding (ultrasonic joining), resistance welding, welding by irradiation of high energy rays such as laser beams, or the like can be used. It is particularly preferable to use welding by irradiation of high energy rays such as laser beams.

Figure 12A:
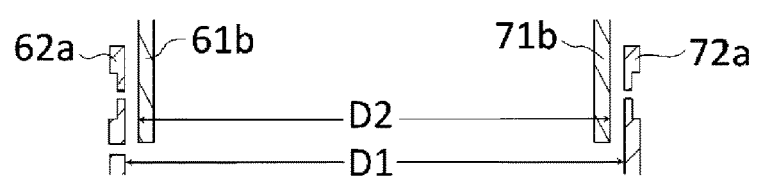
FIG. 12A is a diagram showing the first positive electrode current collector and the first negative electrode current collector located between the second positive electrode current collector and the second negative electrode current collector.
Figure 12B:
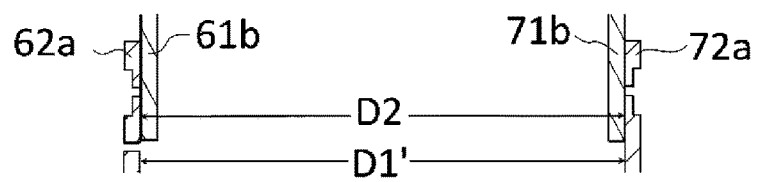
FIG. 12B is a diagram showing the state in which the distance between the second positive electrode current collector and the second negative electrode current collector is made shorter.
Figure 12C:
FIG. 12C is a diagram showing the state after the first positive electrode current collector and the second positive electrode current collector are connected to each other and the first negative electrode current collector and the second negative electrode current collector are connected to each other.

FIGS. 12A to 12C are cross-sectional views in respective stages, along the winding axis of the electrode assembly 3, of the second region 61b of the first positive electrode current collector 61, the second region 71b of the first negative electrode current collector 71, the second region connecting portion 62a of the second positive electrode current collector 62, and the second region connecting portion 72a of the second negative electrode current collector 72.

As shown in FIG. 12A, the second region 61b of the first positive electrode current collector 61 and the second region 71b of the first negative electrode current collector 71 are located between the second region connecting portion 62a of the second positive electrode current collector 62 and the second region connecting portion 72a of the second negative electrode current collector 72. At this time, the distance D1 between the inner surface of the second region connecting portion 62a and the inner surface of the second region connecting portion 72a is preferably larger than the distance D2 between the outer surface of the second region 61b and the outer surface of the second region 71b. It should be noted that D1 is preferably 0.1 to 5 mm, more preferably 0.2 to 3 mm larger than D2.

Next, as shown in FIG. 12B, the second region connecting portion 62a and/or the second region connecting portion 72a are displaced inward so that the distance between the second region connecting portion 62a and the second region connecting portion 72a is made smaller. This changes the distance D1 between the inner surface of the second region connecting portion 62a and the inner surface of the second region connecting portion 72a to D1'. At this time, the difference between D2 and D1' is preferably 0 to 0.2 mm.

In the state shown in FIG. 12B, the second region connecting portion 62a and the second region connecting portion 72a are irradiated with a high energy beam such as a laser beam. Consequently, the second region 61b of the first positive electrode current collector 61 and the second region connecting portion 62a of the second positive electrode current collector 62 are welded and joined together, and the second region 71b of the first negative electrode current collector 71 and the second region connecting portion 72a of the second negative electrode current collector 72 are welded and joined together.

As shown in FIG. 12C, a joint 64 which is a welded portion between the second region 61b and the second region connecting portion 62a is formed in the recess 62d. In addition, a joint 74 which is a welded portion between the second region 71b and the second region connecting portion 72a is formed in the recess 72d.

Through the procedure shown in FIGS. 12A to 12C, the first positive electrode current collector 61 and the second positive electrode current collector 62, and the first negative electrode current collector 71 and the second negative electrode current collector 72 can be welded more stably in a simpler manner. As a result, highly reliable joints 64 and 74 can be formed.

The portions in which the recesses 62d and 72d are formed are thinner than the surrounding area. Welding in such a way that the joints 64 and 74 are formed in the thinner portions allows the joints with a higher quality to be formed more stably. Therefore, the secondary battery becomes more reliable. In addition, the through hole 62e is used to determine whether or not there is a gap between the second region 61b and the second region connecting portion 62a or measure the size of the gap, thereby welding and joining the second region 61b and the second region connecting portion 62a together more stably. Note that the same applies to the through hole 72e.

Figure 13:
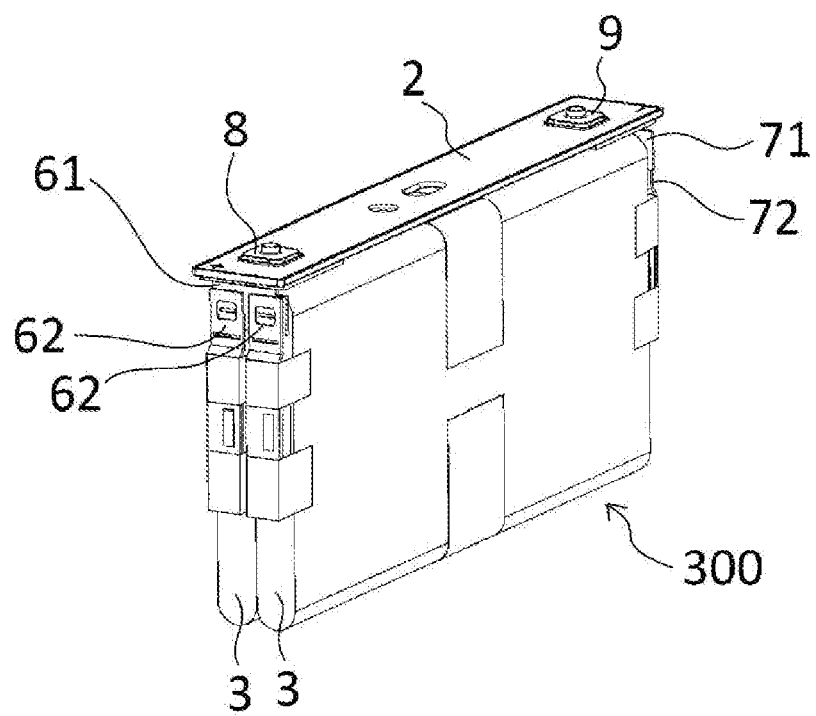
FIG. 13 is a perspective view of the sealing plate and electrode assembly group after the first positive electrode current collector and the second positive electrode current collector are connected to each other, and the first negative electrode current collector and the second negative electrode current collector are connected to each other.

FIG. 13 is a perspective view after the first positive electrode current collector 61 and the second positive electrode current collector 62 are connected to each other, and the first negative electrode current collector 71 and the second negative electrode current collector 72 are connected to each other.

[Electrode Assembly Holder]

Figure 14:
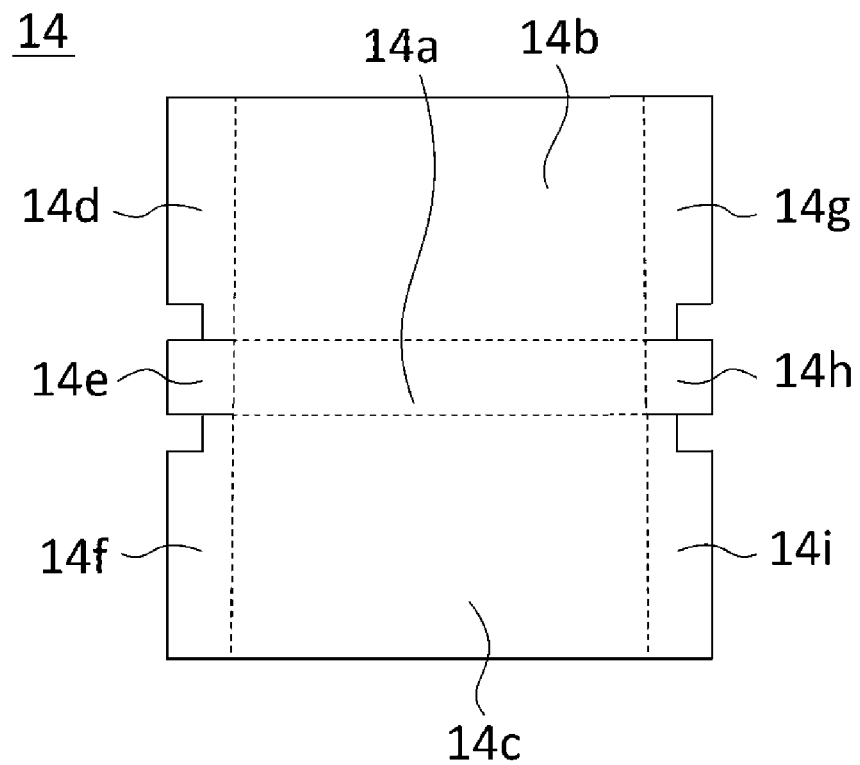
FIG. 14 is an expanded view of an electrode assembly holder of the embodiment.

FIG. 14 is an expanded view of the electrode assembly holder 14. In FIG. 14, the insulating sheet that constitutes the electrode assembly holder 14 is bent along the dashed lines to make a box-shaped electrode assembly holder 14. The electrode assembly holder 14 has a holder bottom 14a, a first holder main surface 14b, a second holder main surface 14c, a first holder side surface 14d, a second holder side surface 14e, a third holder side surface 14f, a fourth holder side surface 14g, a fifth holder side surface 14h, and a sixth holder side surface 14i.

When the electrode assembly holder 14 has a box shape, it has a region where the first holder side surface 14d, the second holder side surface 14e, and the third holder side surface 14f overlap each other, and a region where the fourth holder side surface 14g, the fifth holder side surface 14h, and the sixth holder side surface 14i overlap each other.

With an electrode assembly group 300 located in the box-shaped electrode assembly holder 14, the electrode assembly group 300 is inserted into the rectangular outer body 1. The sealing plate 2 is then joined to the rectangular outer body 1, and the opening of the rectangular outer body 1 is sealed by the sealing plate 2. The electrolyte is injected through the electrolyte injection hole 15 in the sealing plate 2, and the electrolyte injection hole 15 is sealed with the sealing member 16. A secondary battery 20 is completed in this manner.

[Secondary Battery]

In the secondary battery 20 according to the embodiment, the positive electrode current collector 6 includes the first positive electrode current collector 61 and the second positive electrode current collector 62. With this configuration, in bending the positive electrode tab group 40, the positive electrode tab group 40 can be bent without bending the positive electrode current collector 6, so that a secondary battery with a high volumetric energy density can be made in a simpler and more stable manner. This is more effective when the number of electrode assemblies 3 contained in the battery case 100 is two or more. With the present disclosure, the flexibility of the number of electrode assemblies 3 to be contained in the battery case 100 can be enhanced. With the present disclosure, even in the case where the number of electrode assemblies 3 contained in the battery case 100 is more than two, a highly reliable secondary battery can be manufactured stably without making the positive electrode current collector 6 complex in shape. The present disclosure is particularly effective when the number of electrode assemblies 3 contained in the battery case 100 is more than two and is an odd number.

In the secondary battery 20, the tab connecting portion 62c of the second positive electrode current collector 62 is located closer to the first side wall 1b of the rectangular outer body 1 than the second region connecting portion 62a of second positive electrode current collector 62. With this configuration, the space between the first side wall 1b and the electrode assembly 3 can be utilized more effectively, so that the power generator of the electrode assembly 3 can be made larger, resulting in a secondary battery with a higher volumetric energy density. The same applies to the second negative electrode current collector 72.

In the electrode assembly 3, the positive electrode tab group 40 is preferably displaced toward the sealing plate 2. This shortens the conduction path from the positive electrode tab group 40 to the positive electrode terminal 8, resulting in a secondary battery 20 with low internal resistance. In the electrode assembly 3, the negative electrode tab group 50 is preferably displaced toward the sealing plate 2.

This shortens the conduction path from the negative electrode tab group 50 to the negative electrode terminal 9, resulting in a secondary battery 20 with low internal resistance.

An insulating member (not shown in the drawing) different from the electrode assembly holder 14 is preferably located between the region where the second region 61b of the first positive electrode current collector 61 and the second region connecting portion 62a of the second positive electrode current collector 62 overlap each other, and the first side wall 1b of the rectangular outer body 1. Also, an insulating member (not shown in the drawing) different from the electrode assembly holder 14 is preferably located between the region where the second region 71b of the first negative electrode current collector 71 and the second region connecting portion 72a of the second negative electrode current collector 72 overlap each other, and the first side wall 1c of the rectangular outer body 1. This configuration can suppress damage to the joints between the members, the positive electrode tab group 40, or the negative electrode tab group 50 even when the secondary battery 20 is subjected to shock or vibration.

Figure 15:
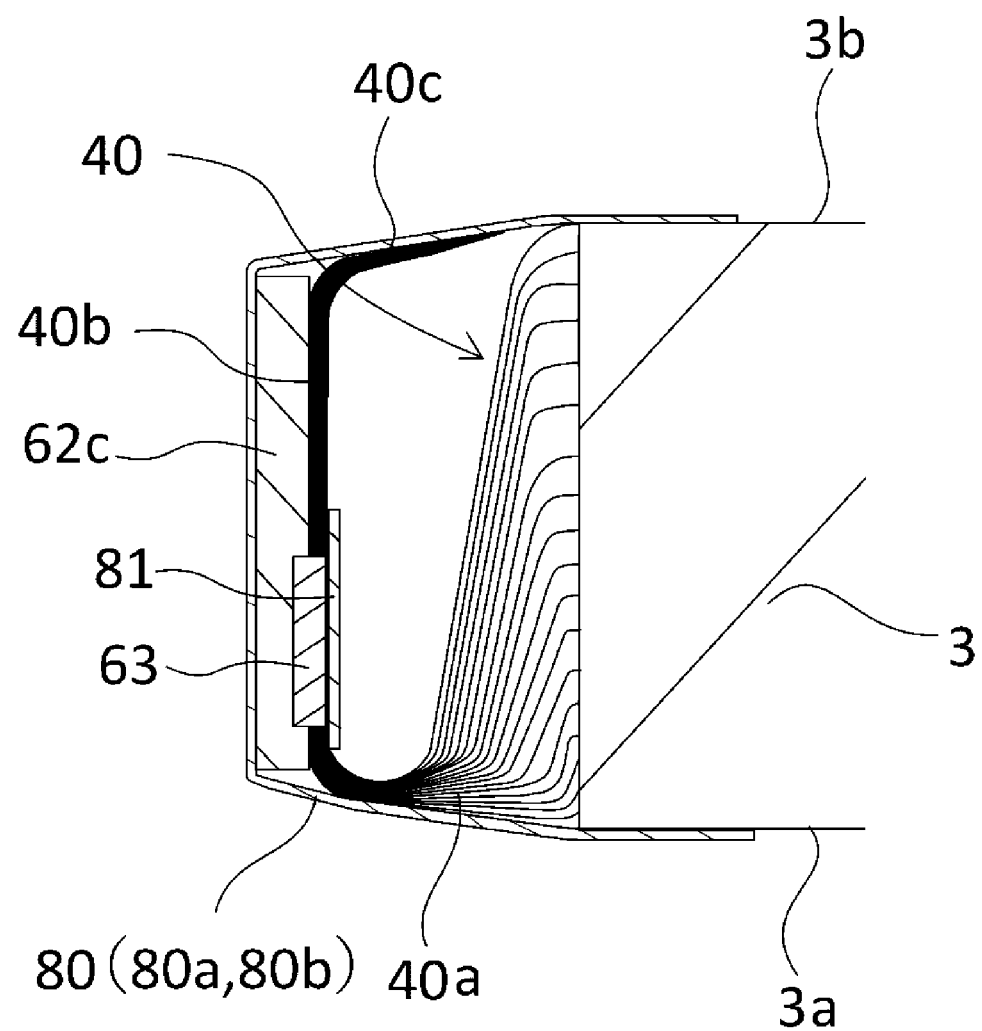
FIG. 15 is a cross-sectional view of the vicinity of the connection between the connecting portion of the second positive electrode current collector and the positive electrode tab group in another embodiment, showing the state in which the positive electrode tab group is bent and fixed

FIG. 15 is a cross-sectional view of, in another embodiment, the vicinity of the joint 63 between the tab connecting portion 62c of the second positive electrode current collector 62 and the positive electrode tab group 40, showing the state in which the positive electrode tab group 40 is bent and fixed. As shown in FIG. 15, the portion of the tab connecting portion 62c of the second positive electrode current collector 62 where the joint 63 is formed can be covered with the tape 80. Even if burrs or metal powder generated during the formation of the joint 63 exist in the portion of the tab connecting portion 62c of the second positive electrode current collector 62 where the joint 63 is formed, the tape 80 can suppress the movement of the burrs and metal powder.

In addition, as shown in FIG. 15, the portion of the positive electrode tab group 40 where the joint 63 is formed can be covered with the tape 81. Even if burrs or metal powder generated during the formation of the joint 63 exist in the portion of the positive electrode tab group 40 where the joint 63 is formed, the tape 81 can suppress the movement of the burrs and metal powder. It is preferable that the tape 81 be applied before the positive electrode tab group 40 is bent.

Note that an adhesive can be applied or affixed to the portion of the tab connecting portion 62c of the second positive electrode current collector 62 where the joint 63 is formed and/or to the portion of the positive electrode tab group 40 where the joint 63 is formed. The portion of the tab connecting portion 62c of the second positive electrode current collector 62 where the joint 63 is formed and/or the portion of the positive electrode tab group 40 where the joint 63 is formed can be covered with a heat welding resin. In addition, the tab connecting portion 72c of the second negative electrode current collector 72 and the negative electrode tab group 50 can be configured in the same manner.

In the secondary battery 20 according to the aforementioned embodiment, one electrode assembly 3 has one second positive electrode current collector 62 and one second negative electrode current collector 72 attached to it. This is, however, not limiting. Multiple second positive electrode current collectors and/or multiple second negative electrode current collectors can be attached to one electrode assembly 3. Another embodiment in which multiple second positive electrode current collectors are attached to one electrode assembly 3 will be described below. Note that multiple second negative electrode current collectors can be attached to one electrode assembly 3 in the same manner. In the other embodiment, parts in common with the secondary battery 20 according to the aforementioned embodiment are omitted from the description.

Figure 16:
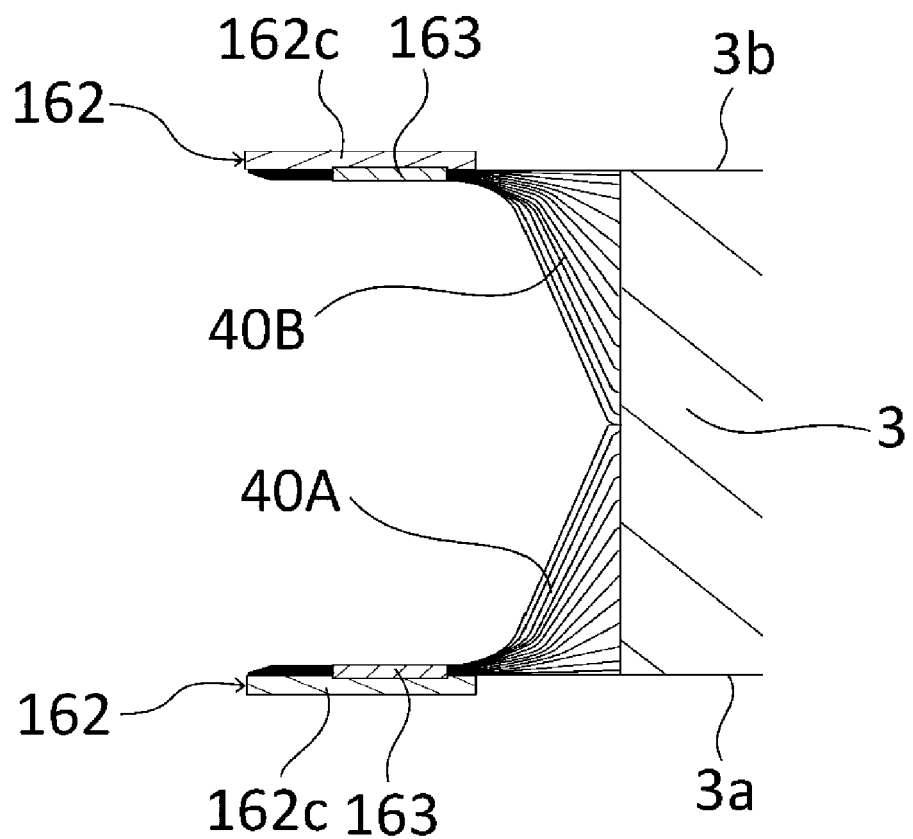
FIG. 16 is a cross-sectional view of the second positive electrode current collector with the positive electrode tab group connected to it, in another embodiment.

As shown in FIG. 16, the positive electrode tab group 40 is divided into two groups: one positive electrode tab group 40A and the other positive electrode tab group 40B, each to which the tab connecting portion 162c of the second positive electrode current collector 162 is connected by welding, thereby forming a joint 163. One positive electrode tab group 40A is preferably gathered on the first main surface 3a side, and the other positive electrode tab group 40B is preferably gathered on the second main surface 3b side. Note that the second positive electrode current collector 162 can be configured in the same manner as the second positive electrode current collector 62 according to the aforementioned embodiment.

Figure 17:
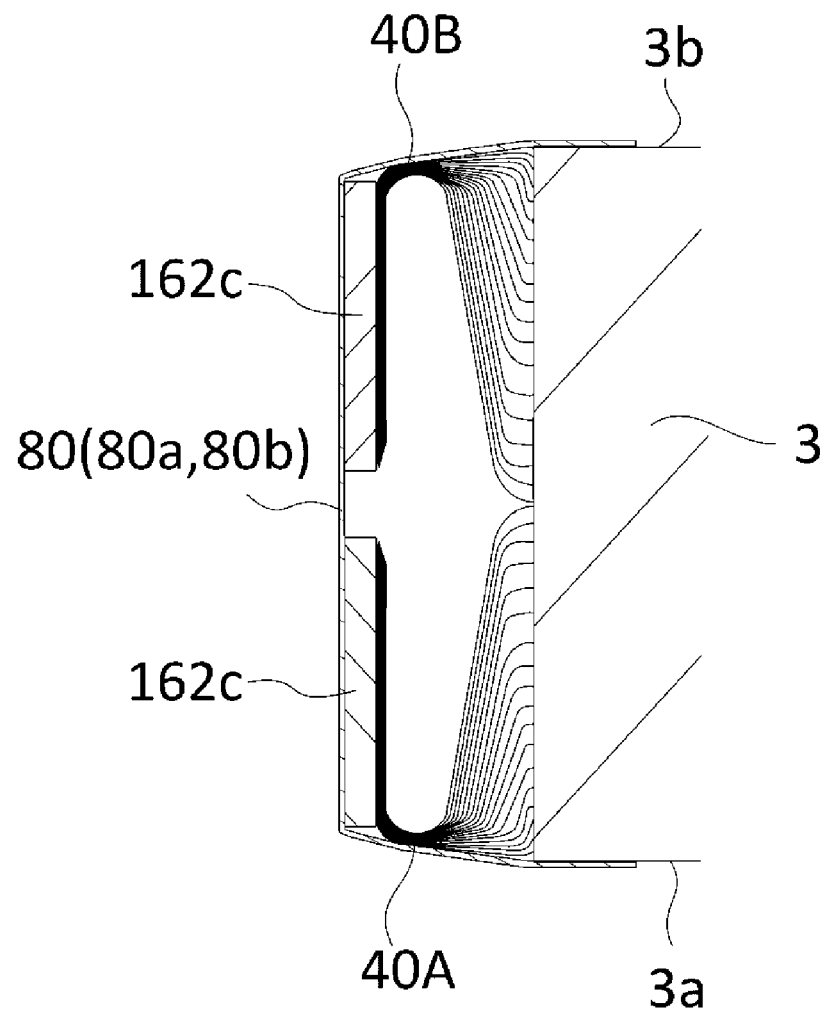
FIG. 17 is a cross-sectional view of the vicinity of the connecting portion between the second positive electrode current collector and the positive electrode tab group in another embodiment, showing the state in which the positive electrode tab group is bent and fixed.

As shown in FIG. 17, while the positive electrode tab group 40A bundled on the first main surface 3a side is bent toward the center of the electrode assembly 3 with respect to the thickness direction, and the positive electrode tab group 40B bundled on the second main surface 3b side is bent toward the center of the electrode assembly 3 with respect to the thickness direction, they are fixed with the tape 80 as fixing means.

Figure 18:
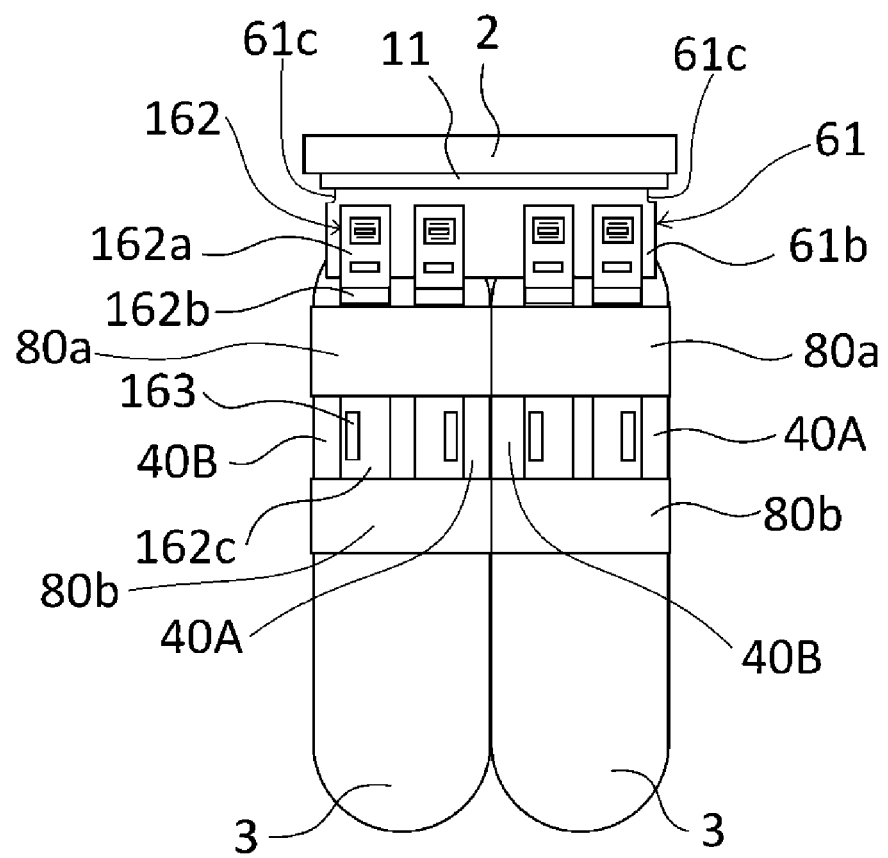
FIG. 18 is a diagram showing the first positive electrode current collector with the second positive electrode current collector connected to it in another embodiment.

As shown in FIG. 18, in one electrode assembly 3, the second positive electrode current collector 162 connected to the positive electrode tab group 40A and the second positive electrode current collector 162 connected to the positive electrode tab group 40B are connected to the first positive electrode current collector 61 by welding. The second positive electrode current collector 162 has a second region connecting portion 162a, a slope portion 162b, and a tab connecting portion 162c. The second region connecting portion 162a is connected to the second region 61b of the first positive electrode current collector 61. The configuration of the other embodiment is particularly effective when an electrode assembly 3 has a larger thickness.

<Other Aspects>

The aforementioned embodiments have shown an example case where the electrode assembly is a wound electrode assembly in which a positive electrode plate and a negative electrode plate are wound with a separator therebetween; however, this is not limiting. It can also be a multilayer electrode assembly including multiple positive electrode plates and multiple negative electrode plates.

The aforementioned embodiments have shown an example case where a wound electrode assembly is prepared by winding a positive electrode plate with multiple positive electrode tabs and a negative electrode plate with multiple negative electrode tabs together; however, this is not limiting. It is also possible to make a positive electrode tab group or negative electrode tab group by cutting the exposed portion of the wound positive electrode current collector or the exposed portion of the negative electrode current collector in the wound electrode assembly.

The aforementioned embodiments have shown an example case where the positive electrode current collector 6 and the negative electrode current collector 7 each consist of two parts; however, the positive electrode current collector 6 and the negative electrode current collector 7 may each consist of a single part.

Known materials can be used for the positive electrode plate, negative electrode plate, separator, electrolyte, and the like.

The aforementioned aluminum includes aluminum and aluminum-based aluminum alloys. The aforementioned copper includes copper and copper-based copper alloys. The aforementioned iron includes iron and iron-based iron alloys. The aforementioned nickel includes nickel-based nickel alloys.

The tape preferably has a base and an adhesive layer formed on the base. The base is preferably composed of polyethylene, polypropylene, polyester, nylon, vinyl chloride, Teflon®, polyimide, Kapton®, polyphenylene sulfide, polyethylene naphthalate, or the like. The material for the adhesive layer is preferably composed of acrylic adhesive material, silicon adhesive material, rubber adhesive material, or the like. However, these materials are not limiting. Note that the adhesive layer preferably exhibits adhesive properties at room temperature.

The embodiments have shown an example case where the fixing means are a tape; however, this is not limiting. The fixing means can be a resin frame, a metal frame, a ceramic frame, a clip-like member, or the like. Note that the fixing means are preferably a tape.

A pressure-sensitive current interrupting mechanism can be provided in the conduction path between the positive electrode tab group and the positive electrode terminal, or between the negative electrode tab group and the negative electrode terminal. This current interrupting mechanism is activated when the pressure inside the battery case exceeds a predetermined level, and interrupts the conduction path between the positive electrode tab group and the positive electrode terminal, or between the negative electrode tab group and the negative electrode terminal, thereby interrupting the flow of current.

REFERENCE SIGNS LIST

20 Secondary battery
100 Battery case
1 Rectangular outer body
1a Bottom
1b, 1c First side wall
1d, 1e Second side wall
2 Sealing plate
3 Electrode assembly
3a First main surface
3b Second main surface
300 Electrode assembly group
4 Positive electrode plate
4a Positive electrode active material layer
4b Positive electrode tab
4c Positive electrode protective layer
40 Positive electrode tab group
40a Root region
40b Contact region
40c Tip region
5 Negative electrode plate
5a Negative electrode active material layer
5b Negative electrode tab
50 Negative electrode tab group
6 Positive electrode current collector
61 First positive electrode current collector
61a First region
61b Second region
61c Notch
62 Second positive electrode current collector
62a Second region connecting portion
62b Slope portion
62c Tab connecting portion
62d Recess
62e Through hole
62f Fuse section
62g Fuse hole
63, 64 Joint
7 Negative electrode current collector
71 First negative electrode current collector
71a First region
71b Second region
71c Notch
72 Second negative electrode current collector
72a Second region connecting portion
72b Slope portion
72c Tab connecting portion
72d Recess
72e Through hole
74 Joint
8 Positive electrode terminal
9 Negative electrode terminal
10, 12 Outer insulating member
11, 13 Inner insulating member
14 Electrode assembly holder
14a Holder bottom
14b First holder main surface
14c Second holder main surface
14d First holder side surface
14e Second holder side surface
14f Third holder side surface
14g Fourth holder side surface
14h Fifth holder side surface
14i Sixth holder side surface
15 Electrolyte injection hole
16 Sealing member
17 Gas discharge valve
80 Tape
80a First tape
80b Second tape
81 Tape
90 Electrode assembly fixing means
40A, 40B Positive electrode tab group
162 Second positive electrode current collector
162a Second region connecting portion
162b Slope portion
162c Tab connecting portion
163 Joint

The invention claimed is:

1. A secondary battery comprising:
an electrode assembly including a positive electrode plate and a negative electrode plate;
a rectangular outer body having an opening and containing the electrode assembly;
a sealing plate for sealing the opening; and
a terminal attached to the sealing plate, wherein
the electrode assembly has a positive electrode tab group at one end and a negative electrode tab group at the other end,
the electrode assembly has a first main surface and a second main surface oriented facing each other,
the rectangular outer body has a bottom, a pair of first side walls oriented facing each other, and a pair of second side walls oriented facing each other,
the positive electrode tab group is located adjacent to one of the first side walls,
the negative electrode tab group is located adjacent to the other first side wall, the positive electrode tab group or the negative electrode tab group, and the terminal are electrically connected to each other through a current collector, the positive electrode tab group or the negative electrode tab group is connected to the current collector while being bent, and fixing means are attached across the first main surface, the current collector and the second main surface, wherein with respect to the width direction of the current collector, a joint between the current collector and the positive electrode tab group or the negative electrode tab group is displaced toward a root of the positive electrode tab group or the negative electrode tab group.

2. The secondary battery according to claim 1, wherein the end of the fixing means adjacent to the sealing plate is located closer to the sealing plate than the end of the positive electrode tab group or the negative electrode tab group adjacent to the sealing plate, and the end of the fixing means adjacent to the bottom is located closer to the bottom than the end of the positive electrode tab group or the negative electrode tab group adjacent to the bottom.

3. The secondary battery according to claim 1, wherein the end of the current collector adjacent to the bottom is located closer to the bottom than the end of the positive electrode tab group or the negative electrode tab group adjacent to the bottom.

4. A secondary battery comprising:

an electrode assembly including a positive electrode plate and a negative electrode plate;

a rectangular outer body having an opening and containing the electrode assembly;

a sealing plate for sealing the opening; and a terminal attached to the sealing plate, wherein the electrode assembly has a positive electrode tab group at one end and a negative electrode tab group at the other end, the electrode assembly has a first main surface and a second main surface oriented facing each other, the rectangular outer body has a bottom, a pair of first side walls oriented facing each other, and a pair of second side walls oriented facing each other, the positive electrode tab group is located adjacent to one of the first side walls, the negative electrode tab group is located adjacent to the other first side wall, the positive electrode tab group or the negative electrode tab group, and the terminal are electrically connected to each other through a current collector, the positive electrode tab group or the negative electrode tab group is connected to the current collector while being bent, and fixing means are attached across the first main surface, the current collector and the second main surface, wherein the positive electrode tab group or the negative electrode tab group has a contact region that is in contact with the current collector, a root region located closer to the root of the positive electrode tab group or the negative electrode tab group than the contact region, and a tip region located closer to the tip of the positive electrode tab group or the negative electrode tab group than the contact region.

5. The secondary battery according to claim 4, wherein the fixing means are in contact with the tip region.

6. A secondary battery comprising:

an electrode assembly including a positive electrode plate and a negative electrode plate;

a rectangular outer body having an opening and containing the electrode assembly;

a sealing plate for sealing the opening; and a terminal attached to the sealing plate, wherein the electrode assembly has a positive electrode tab group at one end and a negative electrode tab group at the other end, the electrode assembly has a first main surface and a second main surface oriented facing each other, the rectangular outer body has a bottom, a pair of first side walls oriented facing each other, and a pair of second side walls oriented facing each other, the positive electrode tab group is located adjacent to one of the first side walls, the negative electrode tab group is located adjacent to the other first side wall, the positive electrode tab group or the negative electrode tab group, and the terminal are electrically connected to each other through a current collector, the positive electrode tab group or the negative electrode tab group is connected to the current collector while being bent, and fixing means are attached across the first main surface, the current collector and the second main surface, wherein the fixing means are a tape.

* * * * *